(12) United States Patent
Bombaci et al.

(10) Patent No.: US 7,571,379 B2
(45) Date of Patent: Aug. 4, 2009

(54) METHOD AND SYSTEM FOR CONFIGURING REGISTERS IN MICROCONTROLLERS, AND CORRESPONDING COMPUTER-PROGRAM PRODUCT

(75) Inventors: Francesco Bombaci, Messina (IT); Rosalino Critelli, Misterbianco (IT); Gianluca Vincenzo Aureliano, Paternò (IT); Santi Carlo Adamo, Gravina di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 574 days.

(21) Appl. No.: 11/301,372

(22) Filed: Dec. 12, 2005

(65) Prior Publication Data

US 2006/0236173 A1 Oct. 19, 2006

(30) Foreign Application Priority Data

Apr. 15, 2005 (EP) .................................. 05425233

(51) Int. Cl.
 *H04L 1/24* (2006.01)
 *G11C 29/00* (2006.01)
 *G06F 11/00* (2006.01)
(52) U.S. Cl. ...................... 714/823; 714/763
(58) Field of Classification Search ................ 714/25, 714/48, 819, 823
See application file for complete search history.

(56) References Cited

U.S. PATENT DOCUMENTS

| 4,785,453 A | * | 11/1988 | Chandran et al. ............. 714/25 |
| 5,212,694 A | * | 5/1993 | Fujiwara ..................... 714/718 |
| 5,699,509 A | | 12/1997 | Gary et al. |
| 5,894,487 A | * | 4/1999 | Levitan ...................... 714/819 |
| 6,230,058 B1 | | 5/2001 | Legay |

FOREIGN PATENT DOCUMENTS

| DE | 33 12 873 A1 | 10/1984 |
| DE | 101 13 319 A1 | 9/2002 |

OTHER PUBLICATIONS

European Search Report; EP 05 42 5233; Sep. 14, 2005.
STMicroelectronics; "Datasheet: 8-Bit Intelligent Controller Unit (ICU) Two Timer/PWMs. ADC, I²C, SPI, SCI"; XP-002344784; http://www.st.com/stonline/products/literature/ds/8793.pdf; May 2004; retrieved online Sep. 14, 2005.

* cited by examiner

*Primary Examiner*—Shelly A Chase
(74) *Attorney, Agent, or Firm*—Hogan & Hartson LLP

(57) ABSTRACT

A system for configuring registers of microcontrollers includes first register and second registers. The system includes a data source for loading a datum into the first register and the logic complement of said datum in the second register. The system also includes a comparator which verifies the identity between the datum in the first register and the logic complement in the second register, and, where the identity is not verified, generates a signal indicating that the data have been corrupted by a disturbance. The system also includes a final-state machine which disables the comparator during writing of the registers.

20 Claims, 2 Drawing Sheets

US 7,571,379 B2

METHOD AND SYSTEM FOR CONFIGURING REGISTERS IN MICROCONTROLLERS, AND CORRESPONDING COMPUTER-PROGRAM PRODUCT

RELATED APPLICATION

The present application claims priority of European Patent Application No. 05425233.3 filed Apr. 15, 2005, which is incorporated in its entirety herein by this reference.

FIELD OF THE INVENTION

The present invention relates to techniques for configuring registers, such as memory registers, of microcontrollers, and has been developed with particular attention paid to its possible application in systems affected by the presence of electromagnetic disturbance.

BACKGROUND

Electromagnetic disturbance can alter the contents of the registers present within microcontrollers, jeopardizing correct operation of the devices themselves.

In fact, the registers of a microcontroller are typically coupled to a single bus, travelling on which are the information data for a particular register or values of transition between one given item of information and the next. The microcontroller selects at a given instant the particular register in which the contents present on the bus are to be written, setting a latch signal for the particular register selected at the logic value "one".

If, on account of electromagnetic disturbance, the value of a latch signal exceeds a critical threshold and is recognized as a logic "one", on the register enabled by said latch signal the value present at that moment on the bus is stored so that the correct contents of the register are lost.

A typical method for protecting the "critical" values necessary for a correct configuration of the devices envisages that these values will be stored in memory registers of a ROM (Read-Only Memory). This solution presents the drawback that the values stored cannot be modified and personalized on the basis of the type of application and of the specific requirements of the user.

Existing in the literature are various techniques for personalizing the configuration of a microcontroller with values chosen by the user, and of particular interest are the techniques that use structures of the "fuse" type and EPROM (Erasable Programmable Read-Only Memory) programmable structures with option bytes. The fuse structures comprise fuse devices, which, if traversed by a current, enable coupling of a particular node of the circuit to the supply voltage or else to ground. In this way, the definitive configuration of the microcontroller is determined. In the EPROM programmable structures, the option bytes, which are constituted by a nonvolatile-memory region typically present in a microcontroller, the bits of which are accessible directly by the microcontroller, present the advantage, as compared to the fuse structures, of being modifiable a number of times (just in the programming step and not during run-time operation) but call for a high number of direct connections between the microcontroller and the memory.

SUMMARY OF THE INVENTION

From the foregoing description it can be seen that there exists a need for defining solutions capable of configuring the memory registers internal to the microcontrollers which affords greater flexibility, which is addressed by the present invention.

According to the present invention, a method and a corresponding system, as well as a microcontroller equipped with said system, and a computer-program product, which can be loaded into the memory of at least one computer and comprises portions of software code for implementing the aforesaid method are provided. As used herein, the term "computer-program product" is intended to refer to a computer-readable medium containing instructions for controlling a computer system for coordinating execution of the method of the invention. Reference to "at least one computer" is evidently intended to highlight the possibility for the method according to the present invention to be implemented in a distributed and/or modular fashion.

According to an embodiment of the present invention, the solution described herein enables values contained in option bytes of the nonvolatile memory to be written in flip-flop registers upon start-up, reading one byte at a time, and hence without the need to use dedicated connections, and with the purpose of verifying in run time any possible corruption of said registers and of restoring, in that case, the correct value.

It is emphasized that the term "microcontroller" is used herein without setting any specific emphasis on its use as an on-chip computer optimized for controlling devices and equipped with the necessary memories and input/output devices. For the purposes of definition of the scope of the invention, the term "microcontroller" must herein be considered as also comprising e.g. the devices referred to as "microprocessors" or "microcomputers".

BRIEF DESCRIPTION OF THE DRAWINGS

The invention will be now described, purely by way of non-limiting example, with reference to the figures of the annexed plate of drawings, in which.

DETAILED DESCRIPTION

Figure 1:
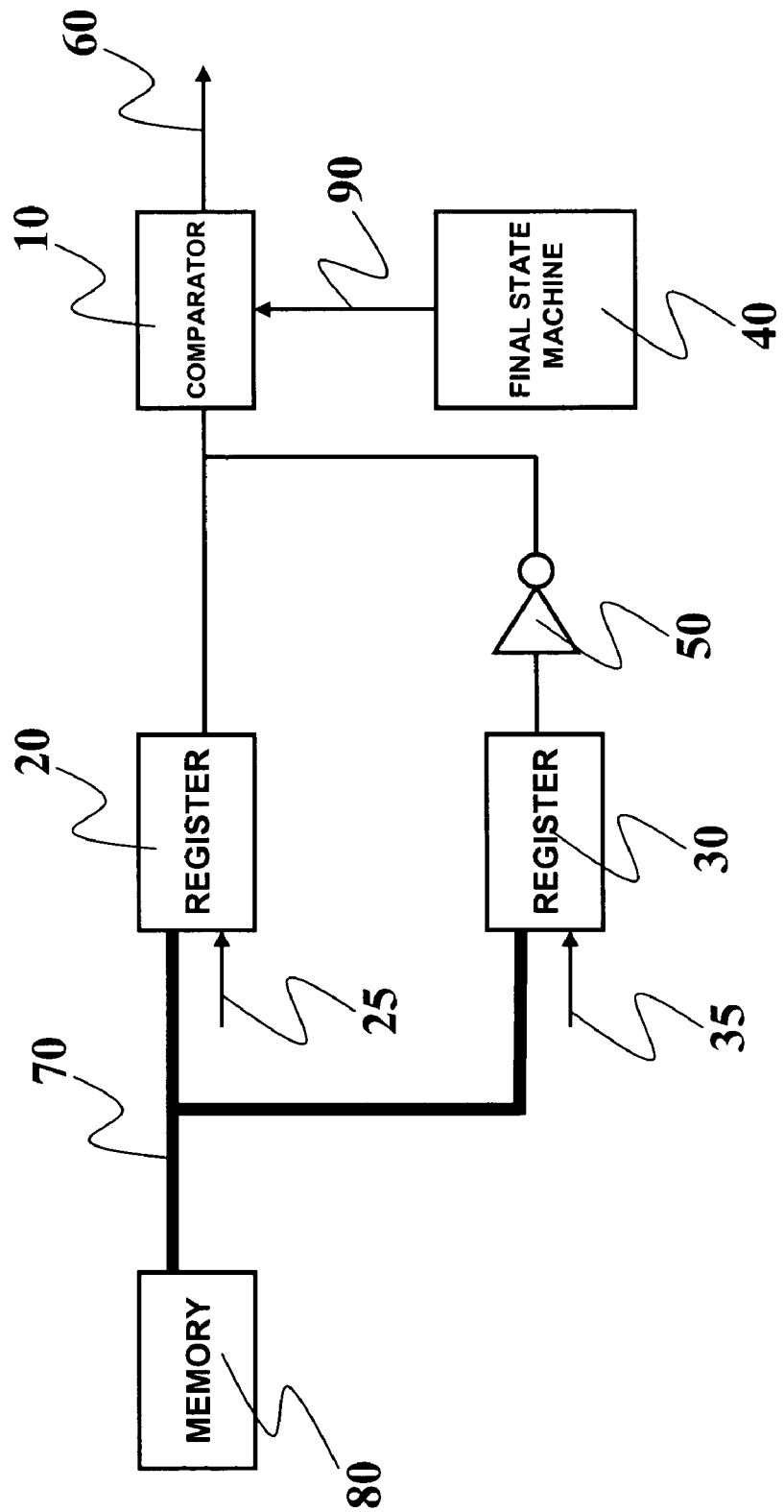
FIG. 1 shows an example of a circuit according to the present invention.

The block diagram of FIG. 1 illustrates the general structure of a part of a microcontroller comprising a set of registers (for example, two registers 20 and 30) coupled, via a bus 70, to a memory 80. Travelling on the bus 70 are the information data for a particular register or values of transition between one given item of information and the next.

Operation of the microcontroller envisages that at a given instant the particular register on which the contents present on the bus 70 are to be written is chosen, setting a latch signal for the particular register selected at the logic value "one".

As has already been described, electromagnetic disturbance can cause the value of a latch signal to exceed a critical threshold and to be recognized as logic "one". On the register enabled—erroneously—by said latch signal, the value present at that moment on the bus is stored, with a consequent loss of the correct contents of the register.

The solution described herein derives from the concept, already known in the art, of using EPROM (Erasable Programmable Read-Only Memory) programmable structures with option bytes. The option bytes are formed by a nonvolatile-memory region in which particular configurations of the microcontroller are contained.

Specifically, the solution described herein envisages the presence, for each option byte, of its complement in the subsequent nonvolatile-memory location.

With reference now to FIG. 1, a generic option byte and its negation are read during the start-up step from the memory 80 and made available on the bus 70 for being stored in the two registers 20, 30.

The value of the option byte is stored in the first register 20 following upon enabling of a latch signal on a line 25; next, the value of the complement of the option byte is stored in the second register 30, once again following upon enabling of a latch signal on a line 35.

A comparator 10 is coupled to the register 20 and to an inverter 50, which is in turn coupled to the register 30. The comparator 10 is thus able to verify whether the contents of the first register 20 and the logic complement of the contents of the second register 30 (i.e., "the complement of the complement", obtained by means of the inverter 50) are identical to one another.

In the case where a disturbance has arisen, and said disturbance has corrupted the contents of one of the two registers 20, 30, the comparator 10 detects the difference and generates an internal reset signal on a line 60, which causes re-reading of the data from the memory 80 and re-writing thereof in the registers 20, 30.

Writing of the complement of the value of the option byte in the second register 30 contributes to rendering the system more immune to disturbance. In fact, if the same value were to be stored in the two registers 20, 30, a sufficiently strong disturbance could lead to a simultaneous and like corruption of the contents of the two registers with the value at that moment present on the bus 70 so that the comparator 10 would not detect any difference.

The above solution presents the advantage of enabling the values stored during the start-up step to be modified a number of times.

The solution described herein envisages the use of flip-flop registers for providing the registers 20 and 30. These are completely reconfigurable by the user, not only during start-up, but also during normal operation of the device. The solution proposed herein hence enables storage of the information data read from the nonvolatile memory during start-up of the device in the flip-flop registers and envisages a technique of recognition of the corruption of the values in the registers and restoration of the correct values.

The technique of recognition of corruption of the values uses the comparator 10, which is provided with an enable input driven, via a line 90, by a final-state machine 40. The final-state machine 40 causes enabling of the comparator 10 only at the end of the operation of writing of the complement of the option byte in the second flip-flop register 30.

The final-state machine 40 comes into play not only in the step of loading of the generic option byte and of its negation but also when the configuration of the device is to be modified in run time changing the value of a generic option byte.

In fact, the reset signal on the line 60 is disabled for the period strictly necessary for modification of the two registers 20, 30 because, between writing in the first register 20 and writing in the second register 30, the comparator 10 detects a difference between the values in the two registers that is not due to corruption and hence must be masked.

Figure 2:
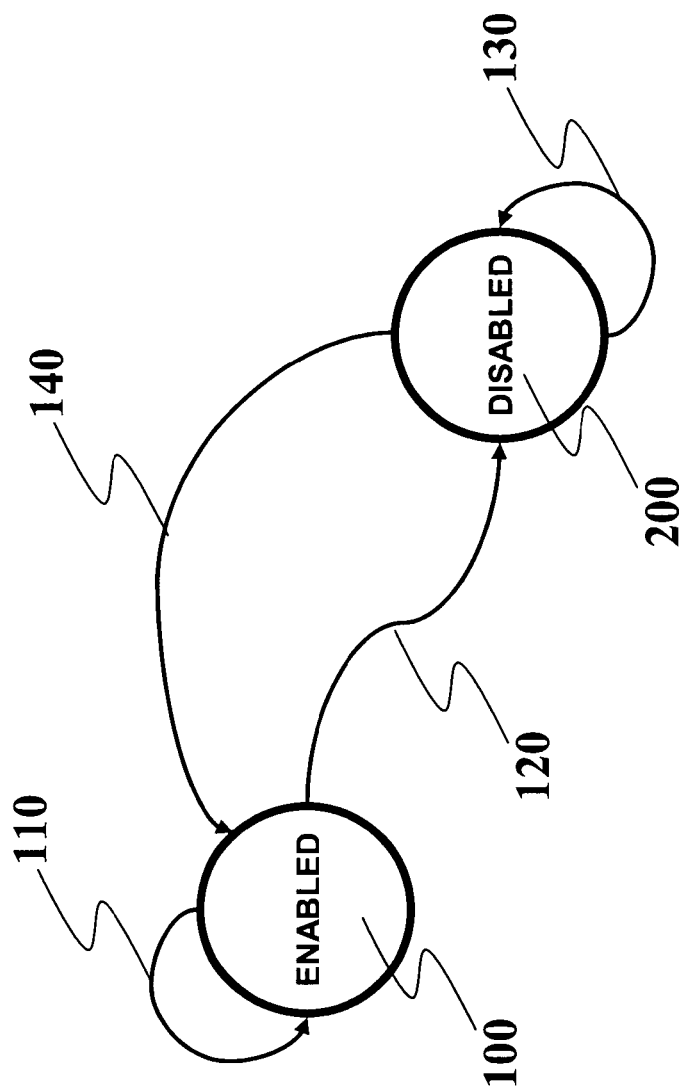
FIG. 2 shows an example of a state diagram of a final-state machine comprised in the circuit of FIG. 1.

FIG. 2 shows the state diagram of the final-state machine of FIG. 1.

The initial state of the final-state machine 40 is the state "Enabled" 100 and in this state the comparator 10 is always enabled. The arrow 110 indicates the permanence of the final-state machine in the state "Enabled" 100. A command 120 for writing of the option byte in the first register 20 causes transition of the final-state machine to the state "Disabled" 200, in which the comparator 10 is disabled.

In said state "Disabled" 200 a count 130 starts, which must be configured on the basis of the characteristics of the microprocessor used, and which maintains the comparator disabled for the time necessary for writing in the second register 30. At the end of the count 130, a time-out 140 is triggered, which brings the final-state machine back into the state "Enabled" 100, which re-enables the comparator 10.

The final-state machine has been devised to be immune to disturbance (noise); in fact, it is only formed by two states and a counter.

If a noise sends the final-state machine to the state "Disabled" 200 (a state that is potentially dangerous because it blocks the check on corruption) after the time-out 140 has been triggered, there is an automatic return to the state "Enabled" 100.

In the case of noise, the count value can be altered, but this simply renders the counting step faster and anticipates exit from the disabled state.

The solution proposed hence enables a configurability of the microcontroller to be provided without any limitations and with a good immunity to electromagnetic noise, further providing the user with the possibility of changing in run time the configuration of the device.

Without prejudice to the principle of the invention, the details of implementation and the embodiments may vary, even extensively, with respect to what is described and illustrated herein purely by way of non-limiting example, without thereby departing from the scope of the invention, as defined in the ensuing claims.

We claim:

1. A method for configuring registers of microcontrollers comprising:

providing at least one first register and one second register, which can receive respective data;

loading a datum in said first register and the logic complement of said datum in said second register;

verifying the identity between the datum contained in said first register and the logic complement of the datum contained in said second register;

generating, in the case where said identity is not verified, a signal indicating that one of said respective data has been corrupted; and storing said data in a nonvolatile-memory region of said microcontroller.

2. The method according to claim 1 wherein said respective data are configured as bytes.

3. The method according to claim 1 wherein loading said one datum in said first register and the logic complement of said datum in said second register is repeated in the case where said identity is not verified.

4. The method according to claim 1 wherein verifying the identity is inhibited during loading of said datum into said first register and loading of the logic complement of said datum into said second register.

5. A system for configuring registers of microcontrollers, the system comprising:

at least one first register and one second register, which can receive respective data;

a source of said respective data for loading a datum into said first register and the logic complement of said datum into said second register;

a comparator for verifying identity between the datum contained in said first register and the logic complement of the datum contained in said second register, and generating, in the case where said identity is not verified, a signal indicating that one of said respective data has been corrupted; and a nonvolatile-memory region for storing said data.

6. The system according to claim 5 wherein said first register and said second register are configured for receiving said respective data in the form of bytes.

7. The system according to claim 5 wherein said first register and said second register comprise flip-flop registers.

8. The system according to claim 5 further comprising a control module for inhibiting operation of said comparator during loading of said datum into said first register and of the logic complement of said datum into said second register.

9. The system according to claim 8 wherein said control module comprises a final-state machine.

10. The system according to claim 9 wherein said final-state machine comprises a first state and a second state for enabling and disabling, respectively, said comparator, as well as a counter with a time limit for bringing back the final-state machine from said second state into said first state.

11. A microcontroller including a system for configuring registers of microcontrollers, the system comprising:

at least one first register and one second register, which can receive respective data;

a source of said respective data for loading a datum into said first register and the logic complement of said datum into said second register;

a comparator for verifying identity between the datum contained in said first register and the logic complement of the datum contained in said second register, and generating, in the case where said identity is not verified, a signal indicating that one of said respective data has been corrupted; and a nonvolatile-memory region for storing said data.

12. The microcontroller according to claim 11 wherein said first register and said second register are configured for receiving said respective data in the form of bytes.

13. The microcontroller according to claim 11 wherein said first register and said second register comprise flip-flop registers.

14. The microcontroller according to claim 11 further comprising a control module for inhibiting operation of said comparator during loading of said datum into said first register and of the logic complement of said datum into said second register.

15. The microcontroller according to claim 14 wherein said control module comprises a final-state machine.

16. The microcontroller according to claim 15 wherein said final-state machine comprises a first state and a second state for enabling and disabling, respectively, said comparator, as well as a counter with a time limit for bringing back the final-state machine from said second state into said first state.

17. A computer-program product which can be loaded into the memory of at least one computer and comprises portions of software code for implementing a method for configuring registers of microcontrollers, the method comprising:

providing at least one first register and one second register, which can receive respective data;

loading a datum in said first register and the logic complement of said datum in said second register;

verifying the identity between the datum contained in said first register and the logic complement of the datum contained in said second register;

generating, in the case where said identity is not verified, a signal indicating that one of said respective data has been corrupted; and storing said data in a nonvolatile-memory region of said microcontroller.

18. The computer-program product according to claim 17 wherein said respective data are configured as bytes.

19. The computer-program product according to claim 17 wherein loading said one datum in said first register and the logic complement of said datum in said second register is repeated in the case where said identity is not verified.

20. The method according to claim 17 wherein verifying the identity is inhibited during loading of said datum into said first register and loading of the logic complement of said datum into said second register.

\* \* \* \* \*